United States Patent [19]
Takada et al.

[11] Patent Number: 5,443,594
[45] Date of Patent: Aug. 22, 1995

[54] AIR-FUEL RATIO CONTROL APPARATUS OF VEHICLE EQUIPPED WITH AUTOMATIC TRANSMISSION

[75] Inventors: Mitsuru Takada, Aichi; Hiroshi Okano, Toyota, both of Japan

[73] Assignee: Toyota Jidosha Kabushiki Kaisha, Toyota, Japan

[21] Appl. No.: 67,007

[22] Filed: May 26, 1993

[30] Foreign Application Priority Data

May 27, 1992 [JP] Japan .................. 4-160124
Feb. 12, 1993 [JP] Japan .................. 5-047426
Mar. 26, 1993 [JP] Japan .................. 5-091970

[51] Int. Cl.$^6$ .................. F16H 59/24; F16H 59/78; F16H 61/16
[52] U.S. Cl. .................. 477/98; 477/111
[58] Field of Search .................. 477/98, 107, 111

[56] References Cited

U.S. PATENT DOCUMENTS

| | | | |
|---|---|---|---|
| 4,098,079 | 7/1978 | Ueda | 477/98 |
| 4,572,029 | 2/1986 | Kinugasa et al. | 477/98 |
| 4,596,164 | 6/1986 | Hasegawa et al. | 477/98 |
| 4,732,130 | 3/1988 | Suzuki | 477/111 |
| 5,178,041 | 1/1993 | Takada | 477/109 |
| 5,309,791 | 5/1994 | Takada et al. | 477/98 |
| 5,311,794 | 5/1994 | Takada et al. | 477/107 |
| 5,337,239 | 8/1994 | Okuda | 477/111 |

FOREIGN PATENT DOCUMENTS 58-59324 4/1983 Japan .
58-143108 8/1983 Japan .
60-233332 11/1985 Japan .

*Primary Examiner*—John J. Vrablik
*Attorney, Agent, or Firm*—Oblon, Spivak, McClelland, Maier & Neustadt

[57] ABSTRACT

A control apparatus of an air fuel ratio in a vehicle equipped with an automatic transmission on which an engine which can set up a plurality of output characteristics by varying the air fuel ratio, and an automatic transmission which sets up the pressure adjustment level of a hydraulic pressure supplied to a frictional engagement device in accordance with the maximum output characteristic of the aforementioned engine, are mounted, providing: a gear shift stage detector which detects the gear shift stage set up by the automatic transmission; and an air-fuel ratio adjuster means which allows the set up of the air fuel ratio so that the output characteristic of the engine becomes the lower output characteristic than the maximum output characteristic where the detected gear shift stage is the highest gear stage.

4 Claims, 10 Drawing Sheets

AIR-FUEL RATIO CONTROL APPARATUS OF VEHICLE EQUIPPED WITH AUTOMATIC TRANSMISSION

BACKGROUND OF THE INVENTION

The present invention relates to a control apparatus of an engine in a vehicle on which an automatic transmission is mounted, more particularly relates to a control apparatus of an engine in which the output characteristic can be changed to a plurality of modes by controlling the air fuel ratio, etc.

To improve the fuel consumption, an engine which can be operated with a higher air fuel ratio than the stoichiometric air fuel ratio has been mounted on the vehicle. In this type of engine, when the air fuel ratio is raised, the output torque is lowered in contrast to a fact that the fuel consumption is improved, and where the engine temperature is low, the combustion becomes difficult to be stabilized, and therefore it is necessary to lower the air fuel ratio, and accordingly the air fuel ratio control has been carried out on a basis of various types of parameters such as a throttle opening degree, engine temperature, etc. One example of an apparatus of performing such a control has been disclosed in Japanese Unexamined Patent Publication No. 60-233332.

Namely, in an engine using the above-mentioned so-called lean burn system, generally, in a state where the throttle opening degree is more than the predetermined level, the air fuel ratio is set on the rich side since the output is regarded as important, and conversely, in a state of a low throttle opening degree, the air fuel ratio is set on the lean side since the fuel consumption is regarded as important. Further, even in a state of the low throttle opening degree, where the engine temperature is low, the air fuel ratio is set be the stoichiometric air fuel ratio or on the rich side so as to stabilize the combustion.

On the other hand, the automatic transmission is constituted so that the motor power transfer route in a gear train, that is the transmission ratio is changed by appropriately engaging or disengaging a frictional engagement device such as a clutch, brake, etc. Accordingly, since these frictional engagement devices transfer the torque or give a reverse force torque, so as to prevent the slippage of the frictional material due to a shortage of the engagement force or an unnecessary consumption of motor power due to an excessive engagement force, the engagement force of the frictional engagement device is controlled in accordance with the torque input from the engine. Concretely, the line hydraulic pressure is controlled so that it becomes a pressure in accordance with the input torque.

As mentioned before, the output characteristic of the engine equipped with the lean burn system becomes a low torque characteristic in a lean burn state where the air fuel ratio is raised, and becomes a high torque characteristic in a state where the air fuel ratio is changed to the stoichiometric air fuel ratio or set on the rich side. The engine equipped with lean burn system provides at least two types of characteristics. The selection of these output characteristics is generally carried out on a basis of the throttle opening degree, and accordingly the output torque in a normal mode is changed as one example as indicated by a fat line in FIG. 10. Nevertheless, since the air fuel ratio is sometimes lowered by the parameters other than the throttle opening degree, for example the engine temperature is low or the like, where for example the engine temperature is low, even if the throttle opening degree is an opening degree TA2 smaller than the predetermined opening degree TA1, the air fuel ratio is lowered and the output characteristic is brought to the high characteristic in some cases. This will be indicated in FIG. 10 as shown by a broken line.

Accordingly, when the throttle opening degree is TA2, two types of engine torques, i.e., an engine torque T1 in a lean burn state and an engine torque T2 with a richer air fuel ratio than this exist. On the other hand, the line hydraulic pressure in the automatic transmission is controlled by the throttle opening degree as one of the parameters, and therefore, in an automatic transmission coupled to the above-described engine in which a plurality of output torques exist with respect to one throttle opening degree, the line hydraulic pressure is controlled in accordance with the high output characteristic. Namely, when the line hydraulic pressure is relatively high with respect to the torque inputted to the automatic transmission, although there is a slight unnecessary consumption of motor power required for generating the high hydraulic pressure, the slippage of the frictional engagement device can be prevented.

In the automatic transmission, however, also the transition state of gear shift is controlled by adjusting the hydraulic pressure, and when that controlled hydraulic pressure is not adequate with respect to the input torque, the gear shift shock is degraded. For example, when the throttle opening degree is a low opening degree in a state where the temperature of the engine is sufficiently high, a lean burn with a raised air fuel ratio is carried out, and therefore the input torque to the automatic transmission becomes low torque, but if the hydraulic pressure of the automatic transmission has been set to a relatively high hydraulic pressure side by expecting the combustion with the stoichiometric air fuel ratio, also an accumulator back pressure controlling the gear shift transition state is shifted with a relatively high pressure. As a result, the torque capacity of the frictional engagement device for an engagement so as to set up a gear shift stage of high speed stage side at an up shift is increased too early period, the gear shift time becomes short, and the gear shift shock is degraded. This state will be indicated as a change in time of the accumulator pressure PACC and the output shaft torque TO of the automatic transmission as shown by a broken line in FIG. 11. Note that, a solid line in FIG. 11 indicates a state where the gear shift shock is good because a pressure adjustment level is adaptable to the input torque.

SUMMARY OF THE INVENTION

A main object of this invention is to provide an air fuel ratio control apparatus for an engine with which a shock at a gear shift by the automatic transmission is not degraded.

Accordingly, an air fuel ratio control apparatus of this invention relates to a vehicle equipped with an automatic transmission on which an engine which can set up a plurality of output characteristics by varying the air fuel ratio, and an automatic transmission which sets tip the pressure adjustment level of the hydraulic pressure supplied to the frictional engagement device in accordance with the maximum output characteristic of the aforementioned engine, are mounted, and this control apparatus provides a gear shift stage detection means of detecting a gear shift stage set by the automatic transmission; and an air fuel ratio adjustment means which allows the set up of the air fuel ratio so that the output characteristic of the aforementioned engine becomes the lower output characteristic than the maximum output characteristic only where the detected gear shift stage is the highest gear stage.

Where the highest gear stage has been set up, the output characteristic of the engine becomes lower than the maximum output characteristic, and contrarily to this, the pressure adjustment level in the automatic transmission is maintained to a level in accordance with the maximum output characteristic, but the gear shift performed from the highest gear stage is always a down shift, and the output characteristic of the engine is switched to the high output characteristic simultaneously with such a gear shift, and therefore an inconsistency between the pressure adjustment level at that gear shift and the output characteristic of the engine is eliminated, and the degradation of the gear shift shock is prevented. That is, a problem discussed above with respect to the prior art, i.e., the torque capacity of the frictional engagement device is increased too early, does not arise.

The above and further objects and novel feature of the invention will more fully appear from the following detailed description when the same is read in connection with the accompanying drawings. It is to be expressly understood, however, that the drawings are for purpose of illustration only and are not intend as a definition of the limits of the invention.

DETAILED DESCRIPTION OF THE PREFERRED EMBODIMENTS

Figure 1:
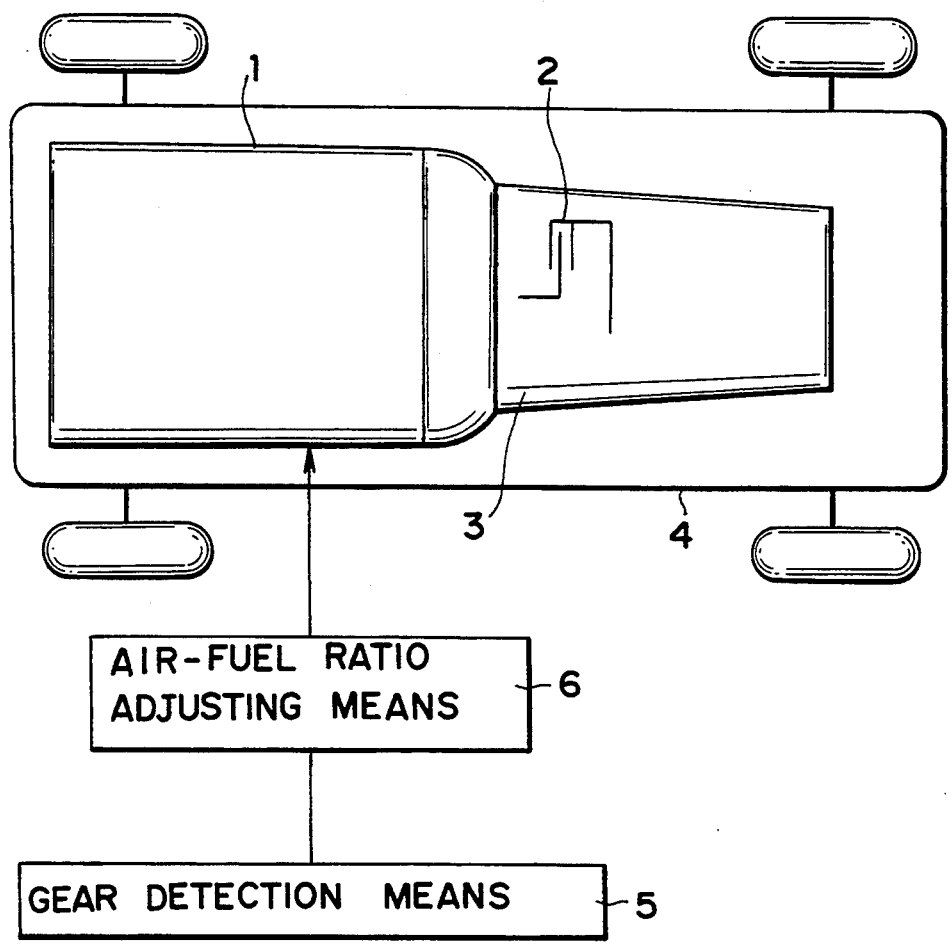
FIG. 1 is a block diagram indicating one example of a control apparatus according to this invention by a functional means.

One example of a control apparatus according to this invention is indicated by a function means in FIG. 1. Namely, this control apparatus is an air fuel ratio control apparatus of an engine of a vehicle 4 equipped with an automatic transmission 3 providing an engine 1 which can set up a plurality of output characteristics by varying the air fuel ratio, and an automatic transmission 3 which sets up the pressure adjustment level of the hydraulic pressure supplied to the frictional engagement device 2 in accordance with the maximum output characteristic of the aforementioned engine 1, and provides: a gear shift stage detection means 5 which detects the gear shift stage set tip in the aforementioned automatic transmission 3; and an air fuel ratio adjustment means 6 which sets up the air fuel ratio so that the output characteristic of the aforementioned engine 1 becomes the lower output characteristic than the maximum output characteristic where the detected gear shift stage is the highest gear stage.

The output characteristic of the engine I is set up to a plurality of characteristics by varying the air fuel ratio. Also, the automatic transmission 3 coupled to this engine I executes the gear shift by engaging or disengaging the frictional engagement device 2. The pressure adjustment level of the hydraulic pressure supplied to that frictional engagement device 2 is set up in accordance with the maximum output characteristic of the engine 1, and accordingly an unnecessary slippage of the frictional engagement device 2 will not occur even in the driving state with the maximum output characteristic of the engine 1. The gear shift stage set up by this automatic transmission 3 is detected by the gear shift stage detection means 5, and where that detected gear shift stage is the highest gear stage, it is allowed that the air fuel ratio adjustment means 6 sets up the air fuel ratio so that the output characteristic of the engine 1 becomes lower characteristic than the maximum output characteristic. Accordingly, also a pressure adjustment level when the vehicle is running at the highest gear stage has become the level ill accordance with the maximum output characteristic, but the gear shift from this gear shift stage is only the down shift, and therefore the gear shift time becomes short since the pressure adjustment level is high, and thus the gear shift shock will not be degraded.

Figure 2:
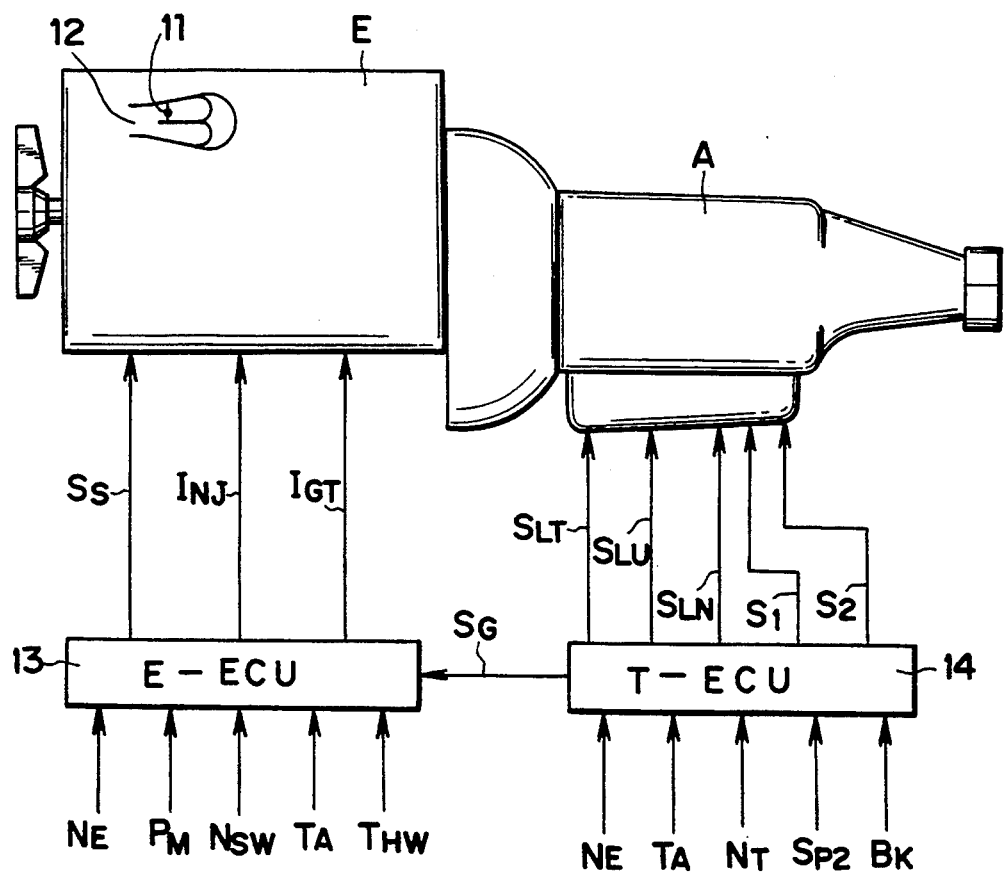
FIG. 2 is a block diagram more concretely indicating a control system of that control apparatus.

FIG. 2 more concretely indicates the above-described control system. In FIG. 2, the engine E is an engine with which a lean burn with a high air fuel ratio, a combustion with the stoichiometric air fuel ratio lower than this, or a combustion with a high output air fuel ratio can be carried out, and a control valve 11 for smoothly producing these combustions is provided in an air intake passageway 12. This control valve 11 is a swirl control valve (SCV) as one example, and for example becomes a closed state where the air fuel ratio is made high by reducing a fuel injection amount, and produces a strong helical flow in a cylinder.

An automatic transmission A coupled to the engine E is a conventionally known transmission constituted so as to set up the predetermined gear shift stage by appropriately engaging the frictional engagement device such as a clutch, brake, etc., by a hydraulic pressure, and the pressure adjustment level of that hydraulic pressure has been set up to a level in accordance with the maximum output characteristic of the aforementioned engine E so that the torque capacity of the frictional engagement device does not lack with respect to the maximum torque which is input. A set up of such a pressure adjustment level can be carried out by, concretely, adjusting the back pressure of the accumulator.

An electronic control unit (E-ECU) 13 of controlling the above-described engine E and an electronic control unit (T-ECU) 14 of controlling the automatic transmission A, are provided and each of these electronic control units 13 and 14 is mainly constituted by a microcomputer comprising a central processing unit (CPU), memory devices (ROM, RAM) and an input/output interface. Then, to the electronic control unit 13 for engine input an engine rotation speed NE, an intake air pressure PM, a signal Nsw from a neutral switch, a throttle opening degree TA, an engine water temperature THW and other signals, and an open/close signal Ss of the control valve 11, and signals with respect to a fuel injection INJ and ignitor IGT, are output.

Also, to the electronic control unit 14 for the automatic transmission input signals such as a vehicle speed Sp2, an engine rotation speed NE, a turbine rotation speed NT, a throttle opening degree TA, a brake signal Bk, etc., and it outputs signals to a line pressure control solenoid valve SLT, a lock up clutch control solenoid valve SLU, an accumulator back pressure control solenoid valve SLN, a gear shift solenoid valves S1 and S2, etc. These electronic control units 13 and 14 are connected so that they mutually transmit and receive various signals necessary for control, and particularly from the electronic control unit 14 for the automatic transmission, a signal SG of indicating the gear shift stage which is set up, is transmitted to the electronic control unit 13 for the engine.

Figure 10:
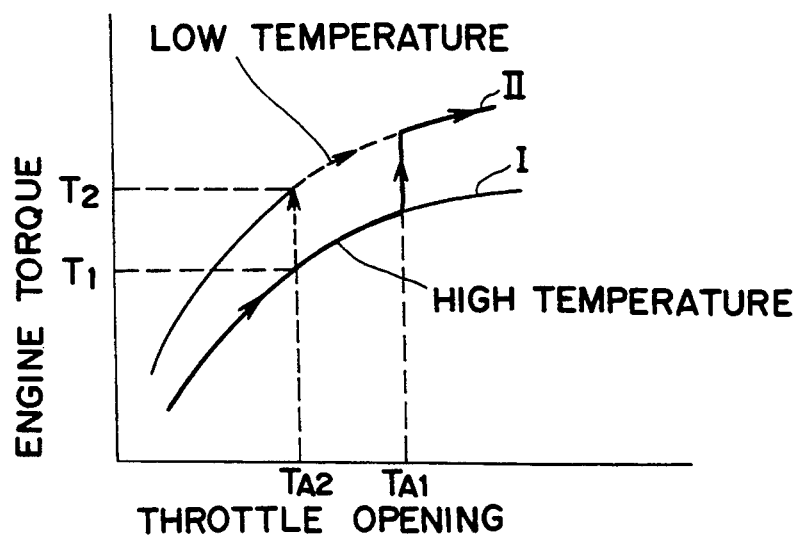
FIG. 10 is a graph indicating relationships between the air fuel ratios and output characteristics.
Figure 11:
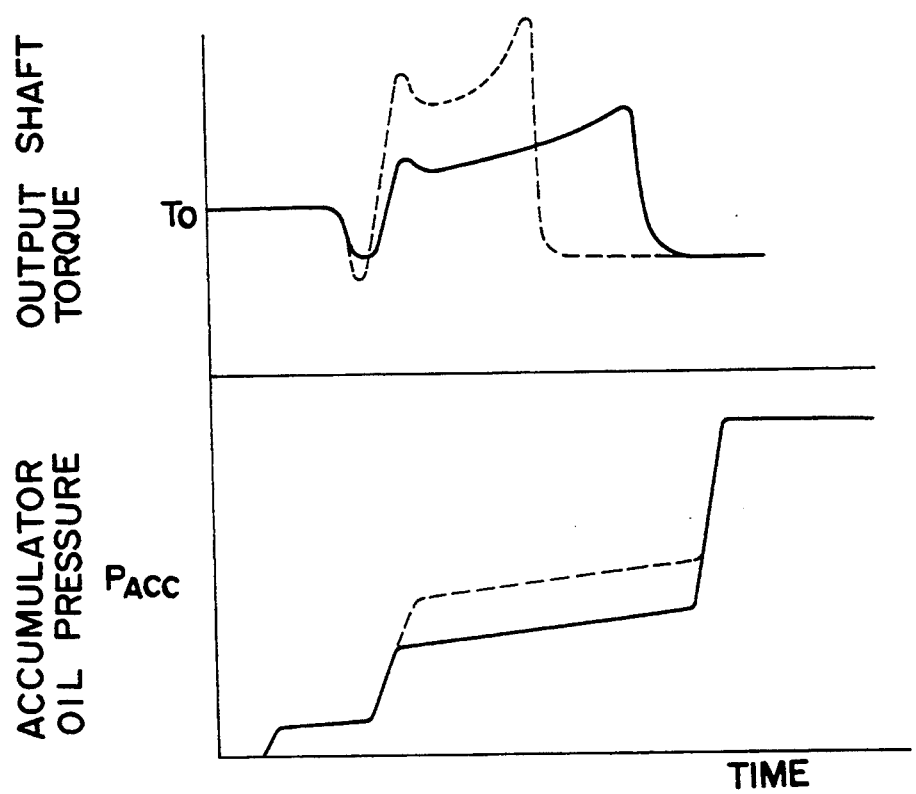
FIG. 11 is a graph indicating a generation situation of a gear shift shock where the output characteristic and the pressure adjustment level are not adaptable.

The above-mentioned electronic control unit 13 for engine is constituted so as to change the output characteristic of the engine E to at least two high and two low aspects by varying the air fuel ratio in accordance with the running state of the vehicle. For example, the output characteristic is controlled so that the engine torque TE is changed along a curve served with a symbol I and a curve served with a symbol II in FIG. 10, and when the engine water temperature THW has become more than the predetermined temperature, the air fuel ratio is controlled so as to exhibit a low output characteristic (curve I) since the fuel consumption is regarded as important when the throttle opening degree TA is TA1 or less, and when the throttle opening degree TA exceeds TA1, the air fuel ratio is controlled so as to exhibit the high output characteristic (curve II) since the motor power performance is regarded as important. Contrarily to this, when the engine water temperature THW is lower than the predetermined temperature, the combustion is not stabilized by the high air fuel ratio, and therefore a control is made so as to exhibit a high output characteristic by lowering the air fuel ratio at a time of relatively small throttle opening degree TAE (<TAE) or more. Note that, in a lean burn state of a high air fuel ratio, the aforementioned control valve 11 is closed, to produce a strong helical flow in the cylinder.

Also, the electronic control unit 14 for the automatic transmission controls the solenoid valve SLN for controlling the accumulator back pressure, thereby performing the pressure adjustment of the hydraulic pressure in the automatic transmission A, and that pressure adjustment level is set up to a level at which the slippage is not produced in the frictional engagement device even in a case where the input torque is the largest.

When switching the output characteristic of the engine E as in the above-mentioned way on a basis of the throttle opening degree TA or the engine water temperature THW, the various requests such as a fuel consumption, motor power performances, etc., can be satisfied, but since the pressure adjustment level of the automatic transmission A has been set up in accordance with the high output characteristic of the engine E, the pressure adjustment level of the automatic transmission A becomes improper in a state of the low output characteristic, and the gear shift shock is sometimes degraded, and therefore the electronic control unit 13 for the engine performs the control of an allowing/non-allowing of the air fuel ratio so that the low output characteristic is exhibited on a basis of the gear shift stage signal SG input from the electronic control unit 14 for the automatic transmission as follows.

Figure 3:
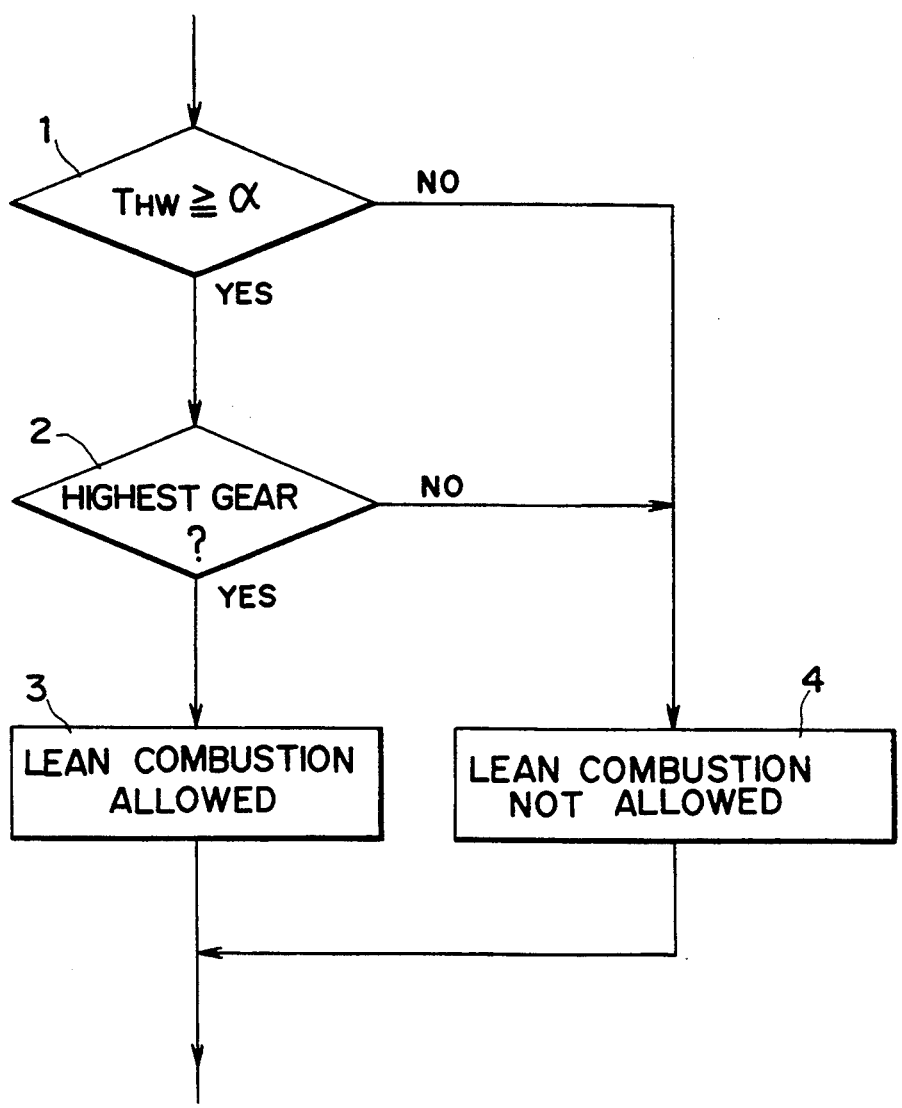
FIG. 3 is a flowchart indicating a control routine of the air fuel ratio.

FIG. 3 is a flowchart indicating a routine for controlling the allowing/non-allowing of the lean combustion with which the low output characteristic is exhibited, and is executed at the electronic control unit 13 for engine. Namely, at step 1, it is decided whether or not the engine water temperature THW is more than a predetermined reference temperature α, and when the engine water temperature THW is more than the reference water temperature α, the processing routine goes to step 2, at which it is decided whether or not the gear shift stage set up by the automatic transmission A is the highest gear stage. When the answer is "YES", that is, the highest gear stage, the processing routine goes to step 3, at which the lean combustion is allowed. When the control of step 3 is executed, to raise the air fuel ratio in the engine E, the output characteristic is lowered, and therefore, in the automatic transmission A, the pressure adjustment level with respect to the input torque becomes relatively high. However, the set up gear shift stage is the highest gear stage, and therefore the gear shift performed from the state of this gear shift stage is always down shift, and accordingly even if the gear shift time becomes short since the pressure adjustment level is high, a gear shift shock will not be degraded.

On the other hand, where the answer of step 1 is "NO", that is where the engine water temperature THW has not reached the reference temperature or the processing routine goes to step 4, at which the execution of the lean combustion is made unallowable. Accordingly, where the engine water temperature is low, the air fuel ratio is held to the stoichiometric air fuel ratio or rich air fuel ratio, and therefore a stable combustion can be carried out. Also, since the gear shift stage set up by the automatic transmission A is not the highest gear stage, where the answer of step 2 is "NO", the processing routine goes to step 4, at which the execution of the lean combustion is made unallowable. Accordingly, the pressure adjustment level is adaptable to the torque input from the engine E to the automatic transmission A and therefore even if an up shift occurs, the gear shift time does not become short, and thus the gear shift shock will not be degraded.

Note that, in the above-described embodiment, an engine water temperature was adopted as the allowing condition of the lean combustion, but it is also possible to adopt another condition replacing this or in addition to this. Moreover, in the above-described embodiment, an example of varying the output characteristic to two aspects was indicated, but in this invention, it is also possible to perform an execution by using an engine in which the output characteristic can be changed to at least three aspects as an object.

In the above-mentioned control apparatus, it is necessary to transmit the signal SG indicating a gear shift stage set up by the automatic transmission A to the electronic control unit 13 for the engine. Accordingly, the automatic transmission A or the electronic control unit 14 for the automatic transmission must be able to electrically detect the set up gear shift stage. Namely, in the control apparatus of the above-described embodiment, the automatic transmission A which can be applied is restricted.

An example of solving such an inconvenience will be shown below. In a control system shown in FIG. 4, it is decided whether the running state is a state adaptable to the highest gear stage, and the air fuel ratio is adjusted on a basis of the result of the decision. Namely, in FIG. 4, the air fuel ratio control apparatus is an air fuel ratio control apparatus relating to a vehicle equipped with an automatic transmission on which an engine I which can set up a plurality of output characteristics by varying the air fuel ratio, and an automatic transmission 3 which sets up the pressure adjustment level of the engagement hydraulic pressure of the frictional engagement device 2 in accordance with the maximum output characteristic of the engine 1, are mounted, and which provides: a highest gear stage allowing region setting means 21 which sets up a region of allowing the set up of the highest gear stage of the automatic transmission 3 on a basis of at least two parameters of the load of the aforementioned engine 1 and the rotation speed of the predetermined rotation member; a running state decision means 22 which decides that the running state determined by the aforementioned two parameters has entered the region of allowing the set up of the aforementioned highest gear stage; and an air fuel ratio setting means 23 which sets up the air fuel ratio of the aforementioned engine 1 to the air fuel ratio for exhibiting the lower output characteristic than the maximum output characteristic where it is decided that the running state has entered the region of allowing the set up of the aforementioned highest gear stage.

The air fuel ratio control apparatus indicated here is an apparatus of varying the air fuel ratio so as to change the output characteristic of the engine 1, and the automatic transmission 3 coupled to that engine 1 sets up the pressure adjustment level of the engagement hydraulic pressure of the frictional engagement device 2 in accordance with the maximum output characteristic of the engine 1. Also, the gear shift region for setting up the gear shift stage of the automatic transmission 3 to the highest gear stage is regulated on a basis of at least two parameters of the load with respect to the engine and the rotation speed of the predetermined rotation member, and a region of allowing the set up of the highest gear stage is set up. Namely, also this region is set up in the highest gear stage allowing region setting means 21 on a basis of the aforementioned at least two parameters and used as an information for the control of the air fuel ratio. Concretely, it is decided by the running state decision means 22 whether or not the running state determined by the aforementioned at least two parameters has entered a region of allowing the set up of the aforementioned highest gear stage, and where it is decided that the running state has entered the region of allowing the set up of the highest gear stage, the air fuel ratio setting means 23 sets up the air fuel ratio so as to exhibit a lower output characteristic than the maximum output characteristic. Namely, where it is decided that the running state has entered the aforementioned lean burn region, the automatic transmission can be always set up to the highest gear stage, and therefore the air fuel ratio is set up to the large value only when the automatic transmission 3 has been set up to the highest gear stage by performing this, and in addition, that control can be carried out without a detection of the actually set up gear shift stage of the automatic transmission 3.

Figure 4:
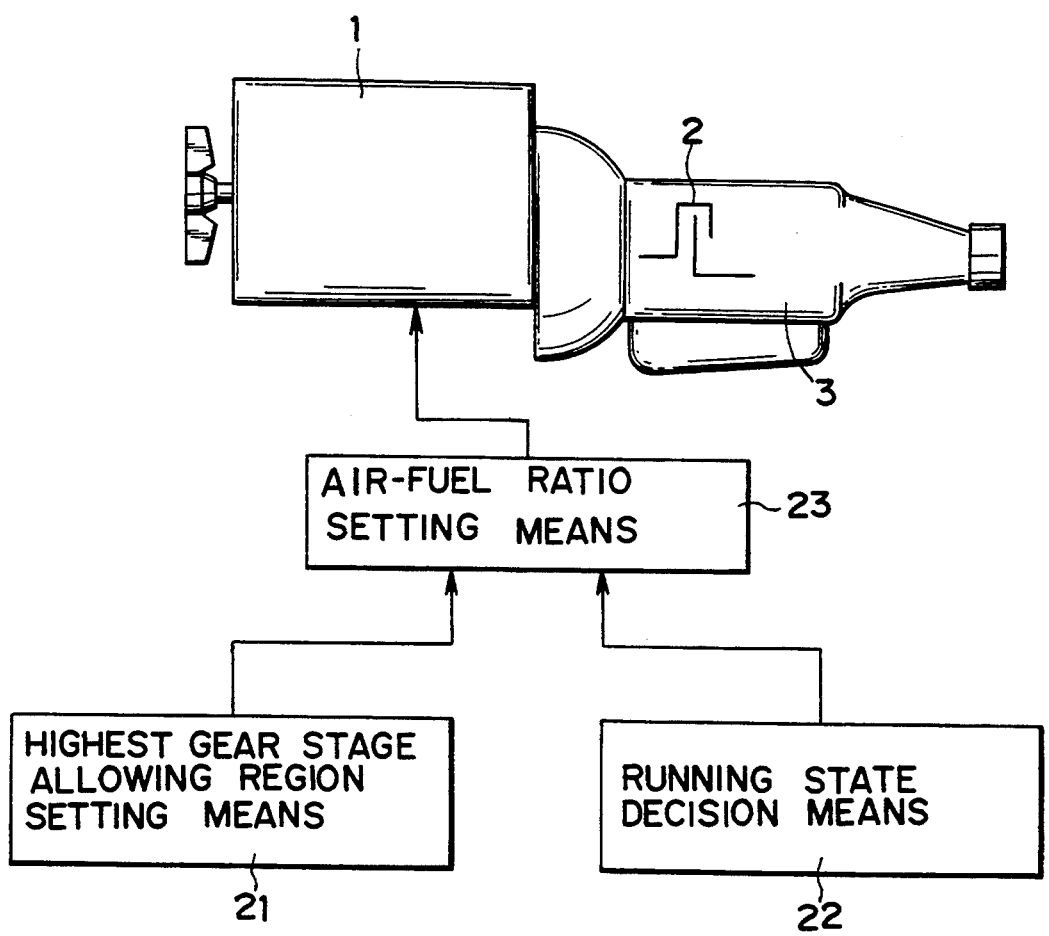
FIG. 4 is a block diagram of another example of a control apparatus according to this invention by a functional means.
Figure 5:
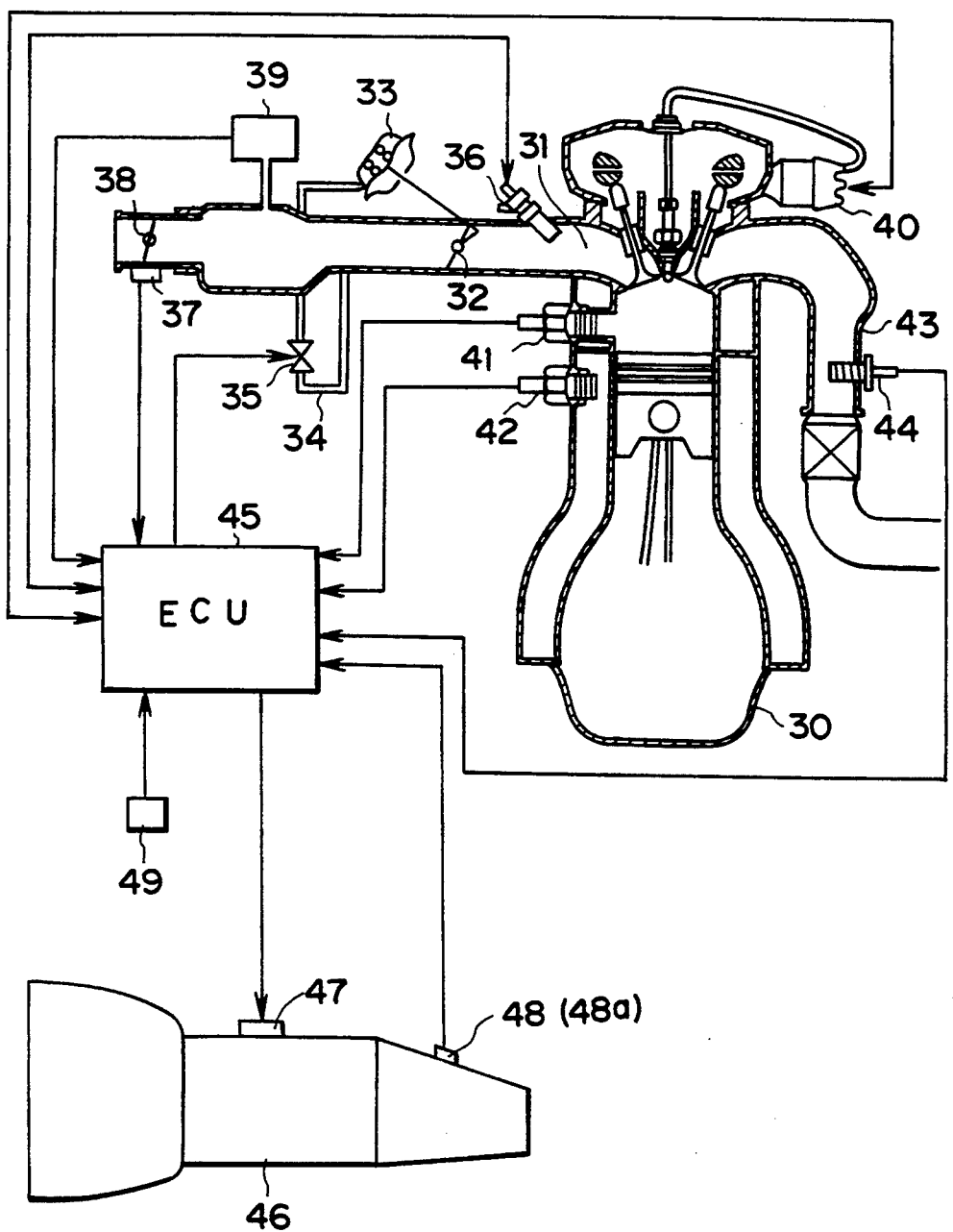
FIG. 5 is a block diagram more concretely indicating that apparatus.

A system of concretely indicating a control system shown in FIG. 4 is indicated in FIG. 5. In FIG. 5, an engine 30 is an engine having a form of providing four valves in one cylinder, provides, as the air intake port thereof, an independent helical port 31 provided with a projection (not illustrated) for producing a helical flow of an air fuel mixture in the cylinder and a straight port (not illustrated) without a projection, and a swirl control valve (SCV) 32 of opening/closing that straight port is provided. This swirl control valve 32 is a valve which is closed when the air fuel ratio is made high, and a vacuum actuator 33 of performing the opening/closing driving thereof is provided, and an open/close valve (vacuum switching valve) 35 is provided in a communication pipe 34 of transferring the vacuum pressure of the air intake passageway to this vacuum actuator 33. Also, an injector 36 which injects the fuel is provided on the downstream side of this swirl control valve 32, and contrarily to this, a throttle valve 38 equipped with a sensor 37 of detecting the opening degree is provided on the upstream side from the swirl control valve 32, and further a pressure sensor 39 of detecting the intake air pressure is provided between this throttle valve 38 and the swirl control valve 32. An engine rotation speed sensor 40, a knocking sensor 41 and a water temperature sensor 42 are further attached to the aforementioned engine 30, and a lean sensor 44 for detecting the air fuel ratio is attached to an exhaust passageway 43.

An electronic control unit (engine control computer: ECU) 45 for controlling the above-described engine 30 is provided, and to this ECU 45 is input output signals of the aforementioned respective sensors 37, 39, 40, 41, 42 and 44, and by controlling the output to the injector 36 and controlling the output to the spark plug on a basis of these input data, the fuel injection amount and ignition timing are controlled. Further, the ECU 45 closes the swirl control valve 32 by operating the aforementioned open/close valve 35 when the predetermined conditions are satisfied, and performs the feed-back control of the air fuel ratio to the lean side according to the output signal of the lean sensor 44.

The automatic transmission 46 coupled to the above-described engine 30 is a hydraulic pressure system automatic transmission which sets up the gear shift stage on a basis of the throttle pressure in accordance with the throttle opening degree and a governor pressure in accordance with the output shaft rotation speed or an electronic control system automatic transmission which executes the gear shift by controlling the solenoid valve (not illustrated) by the signal on a basis of the throttle opening degree and the signal on a basis of the vehicle speed, and in which the pressure adjustment level of the hydraulic pressure of engaging the frictional engagement device such as a clutch, brake, etc., for setting up the respective gear shift stages is set up in accordance with the maximum output characteristic of the engine 30. Also, this automatic transmission 46 can be set up in a plurality of gear shift stages including an over driving stage which is the highest gear stage, and the gear shift to the respective gear shift stages is carried out according to the gear shift map in which the set up regions of the respective gear shift stages are determined by using the engine load (throttle opening degree) and the vehicle speed (or the turbine rotation speed) as the parameters. Further, an O/D cut device 47 of prohibiting the over driving stage and a vehicle speed sensor 48 are attached to the automatic transmission 46, and the O/D cut device 47 operates by the instruction signal from the aforementioned ECU 45, to prohibit the set up to the over driving stage. Note that, so as to prohibit the over driving stage by a manual operation, an O/D cut manual switch 49 is provided so as to be connected to the ECU 45.

Figure 6:
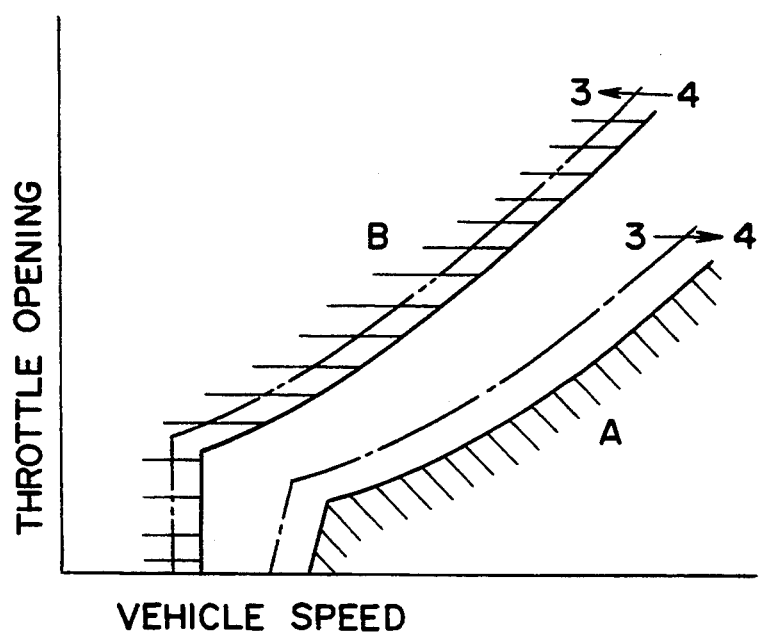
FIG. 6 is a diagram indicating one example of a map in which a region of allowing the set up of the highest gear stage and a region in which it is prohibited are determined.

Then, the ECU 45 provides a map for performing the control of cancellation of prohibition of the over driving stage on a basis of the predetermined conditions. One example of this is indicated in FIG. 6, and this uses the vehicle speed and the throttle opening degree as parameters in similar to the map for the automatic transmission, and the O/D allowing region A is set up on the lighter load side than an up shift line (indicated by a one-dot chain line) to the over driving stage in the gear shift map, and the O/D prohibition region B is set up on the side having a larger load than this, with the lighter load side than a down shift line (indicated by a two-dot chain line) from the over driving stage in the gear shift map as the boundary.

Figure 7:
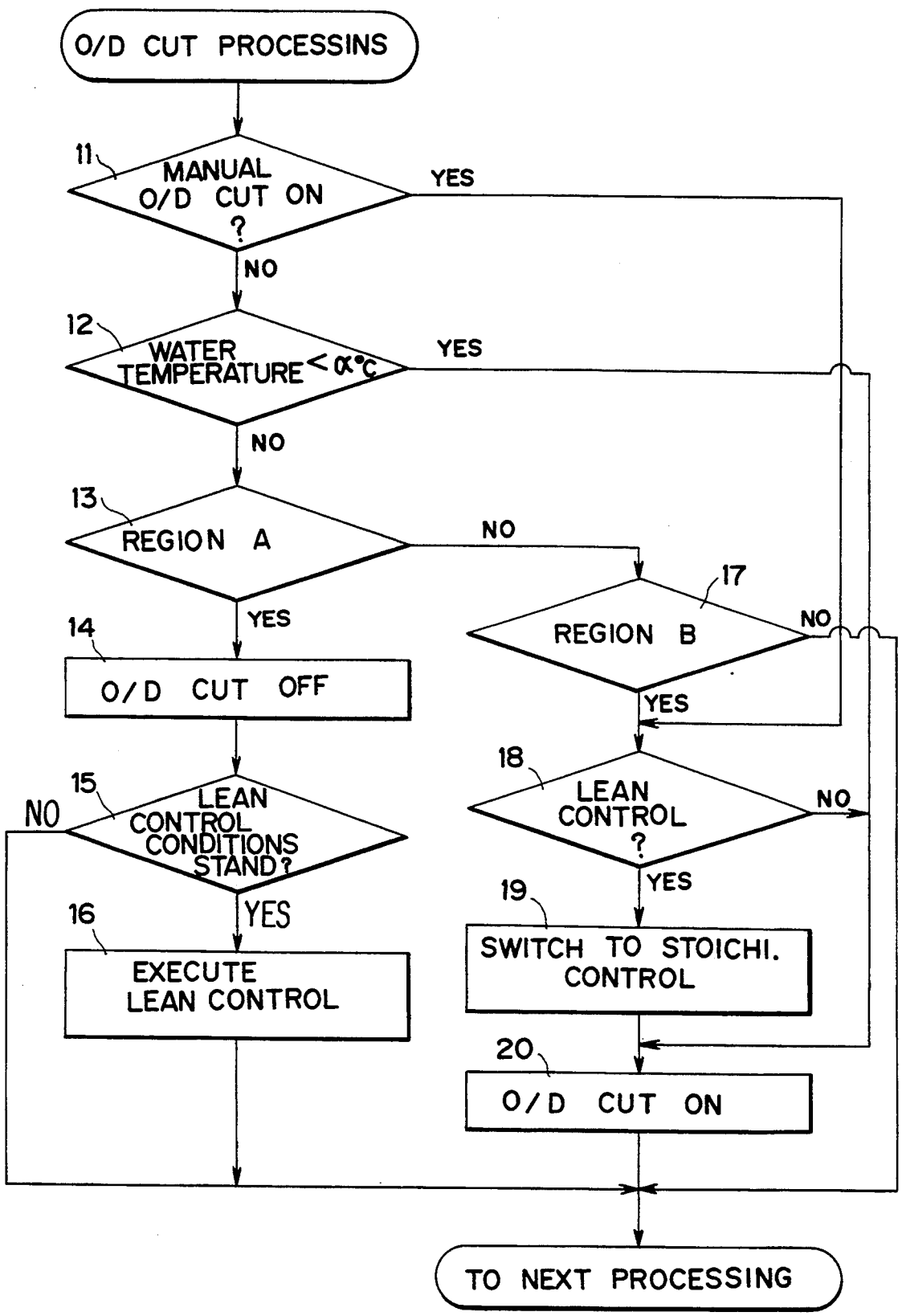
FIG. 7 is a flowchart indicating a control routine of bringing the output characteristic to the low characteristic by raising the air fuel ratio.

FIG. 7 indicates a routine for the control of the prohibition of the over driving stage and the cancellation thereof, and for the lean burn control, which are executed by the above-mentioned control apparatus, and first, at step 11, it is decided whether the aforementioned O/D cut manual switch 19 is ON, that is whether the set up of the over driving stage has been prohibited by the manual operation, and when the set up of the over driving stage has been allowed, it is decided whether the engine water temperature is lower than the reference temperature $\alpha$°C. (step 12). When the engine water temperature is the reference temperature $\alpha$°C. or more, it is decided whether the running state determined by the vehicle speed and the throttle opening degree has entered the aforementioned region A (step 13). This region A is a region in which the set up is made on the lighter load side than the up shift line to the over driving stage in the gear shift map for controlling the automatic transmission 46, and when the running state has entered this region A, it outputs the OFF signal to the aforementioned O/D cut device 47 (step 14). Namely, the prohibition of set up of the over driving stage by the O/D cut device 47 is canceled. Accordingly, the running state has already become a state where the over driving stage should be set up, and therefore when the prohibition control by the O/D cut device 47 is canceled, the gearshift stage always becomes the over driving stage. For this reason, at step 15, it is decided whether or not the other conditions for executing the lean control of raising the air fuel ratio and lowering the output characteristic of the engine 30 have been established, and when the conditions have stood, the lean control is executed (step 16), and where they have not stood, the processing is removed from this routine, and goes to a next processing.

Also, where the answer of step 13 is "NO", that is where it is decided that the running state has not entered the aforementioned region A, the processing routine goes to step 17, at which it is decided whether the running state has entered the region B. When the running state has not entered the region B, the processing is removed from this routine and goes to next processing, and conversely when the running state has entered the region B, the processing routine goes to step 18, at which it is decided whether the lean control of enlarging the air fuel ratio is carried out. The region B is a region provided on the larger load side than a boundary which was set up on the lighter load side than the down shift line from the over driving stage in the gear shift map for controlling the automatic transmission 46, and if the running state has entered this region B, there is a high possibility that it is set up to the lower gear shift stage than the over driving stage, and therefore when the answer of step 18 is "YES", a switching to the stoichiometric air fuel ratio control of lowering the air fuel ratio to the stoichiometric air fuel ratio is carried out (step 19), and subsequently the prohibition control (O/D cut ON) of the over driving stage by the aforementioned O/D cut device 47 is executed (step 20). Accordingly, when according to the gear shift map, in a state where the running state should set up the over driving stage, or a state where it should set up the gear shift stage on the lower speed side by one stage than this, the over driving stage is prohibited, and therefore the gear shift stage is forcibly set up in the gear shift stage on the lower speed side by one stage than the over driving stage, and simultaneously the switching from the lean control to the stoichiometric air fuel ratio control is made.

Note that, in any of the case where the answer of step 12 becomes "YES" since the engine water temperature is low and the case where the answer of step 18 becomes "NO" due to the high load and low vehicle speed and, the lean control has not been carried out, the processing routine goes to step 20, at which the prohibition of the over driving stage is carried out. Further, when the answer of step 11 becomes "YES" since the prohibition of set up of the over driving stage is carried out by the manual operation, the processing routine goes to step 18, at which the control of step 19 through step 20 is executed thereafter.

Accordingly, according to the above-mentioned control, the ECU45 for controlling the engine 30 decides the running state, and when the state becomes a state where the highest gear stage should be set up, it allows this and simultaneously performs the lean control, and therefore the lean control can be carried out only in the highest gear stage without a detection or reception of the actually set up gear shift stage.

Note that, in the embodiment shown in FIG. 5, it is decided on a basis of the running state determined by the vehicle speed, the throttle opening degree, etc., that the highest gear stage is set up, but the highest gear stage can be decided also by the hydraulic pressure. Namely, the automatic transmission is constituted so that the frictional engagement device is engaged by the hydraulic pressure and the respective gear shift stages are set up, and therefore there is a portion of generating the hydraulic pressure only in a case where the highest gear stage is set up, and when the hydraulic pressure switch is provided at that portion, it can be acknowledged that the highest gear stage was set up by ON operation of the hydraulic pressure switch.

Figure 8:
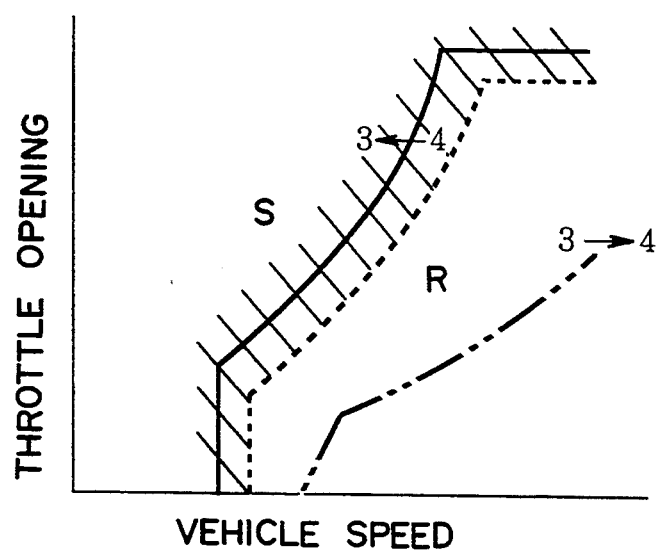
FIG. 8 is a diagram indicating on example of a map in which a lean area of a lean burn engine and a stoichiometric air fuel ratio area are determined.

A control system providing such a hydraulic pressure switch is expressed by a block diagram in which the vehicle speed sensor 48 in FIG. 5 is replaced by a hydraulic pressure switch 48a which performs the ON operation by detecting the hydraulic pressure produced only when the highest gear stage (over driving stage) is set up. Also, in the control system equipped with this hydraulic pressure switch 48a, the ECU45 provides a map of determining the region for setting the air fuel ratio to lean and stoichiometric. One example of this is indicated in FIG. 8, and this uses the vehicle speed and the throttle opening degree as parameters in similar to the gear shift map for the automatic transmission, and the lean region R is set up with a state on a slightly lighter load side than the down shift line (indicated by a solid line in FIG. 8) from the over driving stage in the gear shift map as the boundary (indicated by a broken line in FIG. 8), and the stoichiometric air fuel ratio region S is set up on a larger load side than this. Note that, in FIG. 8, a two-dot chain line indicates an up shift line to the over driving stage in the gear shift map.

Figure 9:
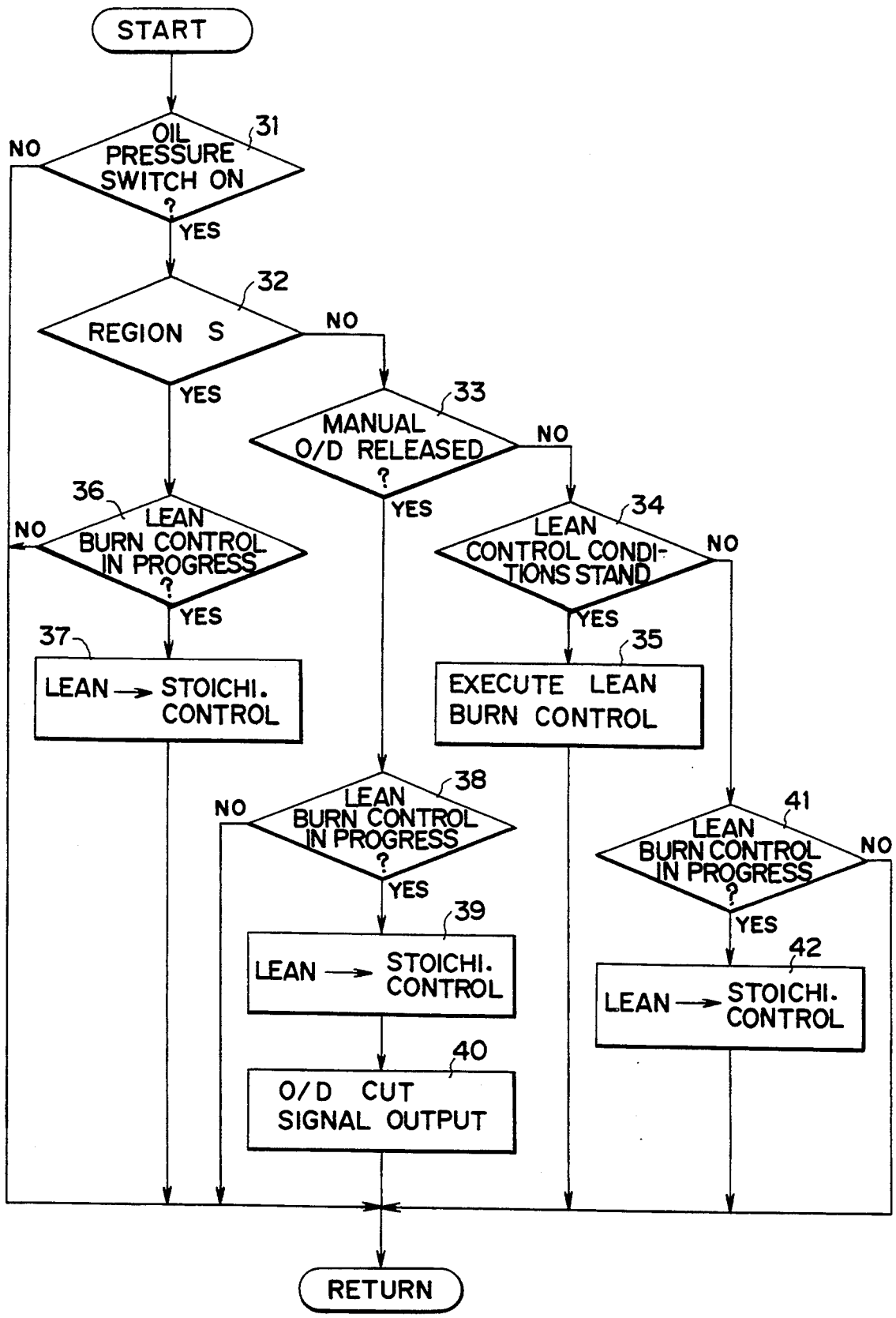
FIG. 9 is a flowchart indicating a control routine setting the air fuel ratio on a basis of output signals from a hydraulic pressure switch.

FIG. 9 indicates a routine for the air fuel ratio control and prohibition control of the over driving stage executed by an apparatus providing the hydraulic pressure switch 48a, and at first, at step 31, it is decided whether the hydraulic pressure switch 48a is ON. This hydraulic pressure switch 48a is a switch which becomes ON by the hydraulic pressure produced only when the over driving stage is set up as mentioned before, and therefore if this has become OFF, the stoichiometric burn is to be carried out by reducing the air fuel ratio, and thus the processing is removed from this routine without a particular control. Also, when this hydraulic pressure switch 48a is ON, a lean burn control is carried out according to the running state, and therefore the processing routine goes to step 32, at which it is decided whether the running state exists ill the stoichiometric air fuel ratio region S.

Where the answer of step 32 is "NO", that is when the running state exists in the lean region R, the processing routine goes to step 33, at which it is decided whether the cancellation control of the over driving stage has been carried out by the manual operation. This is carried out, concretely, by deciding whether the aforementioned O/D cut manual switch 49 is operated so as to prohibit the set up of the over driving stage. Where the answer is "NO", the processing routine goes to step 34, at which it is decided whether the other lean burn control conditions for example the engine water temperature is more than the predetermined temperature, etc., have stood, and when these conditions have stood, the lean burn control is executed (step 35), the air fuel ratio is raised, and the output characteristic of the engine 30 is set up to the characteristic lower than the maximum output characteristic.

On the other hand, where the answer of step 32 is "YES", that is where the running state exists in the stoichiometric air fuel ratio region S even if it is set up to the over driving stage, the processing routine goes to step 36, at which it is decided whether the operation mode is during the lean burn control, and when the answer is "NO", the control routine is returned, and when it is "YES", the control of change from the lean burn to the stoichiometric burn is carried out by reducing the air fuel ratio (step 37). Namely, the output characteristic is set up to the maximum output characteristic.

Also, when the O/D cut manual switch 49 has been operated and the answer of step 33 becomes "YES", the processing routine goes to step 38, at which it is decided whether the processing routine is during the lean burn control, and when the routine is not during the lean burn control, that is in the stoichiometric burn state, the control routine is returned, and when it is during the lean burn control, a control of changing from the lean burn to the stoichiometric burn by reducing the air fuel ratio is executed (step 39). Further, an O/D cut signal of prohibiting the set up to the over driving stage is output (step 40).

Note that, where the answer of step 34 becomes "NO" since the lean control conditions have not stood, the processing routine goes to step 41, at which it is decided whether the routine is during the lean burn control. Then, if the operation mode is not during the lean burn control, the routine is returned, and when the operation mode is during the lean burn control, the processing routine goes to step 42, at which the change from the lean control to the stoichiometric burn control is carried out, and thereafter the routine is returned.

Accordingly, according to the above-mentioned control apparatus, it can be acknowledged whether the lean burn control is to be allowed according to the presence/absence of the signal from the hydraulic pressure switch 48a without the direct detection of the gear shift stage actually set up in the automatic transmission 46. For this reason, the above-mentioned control apparatus can be used also for the control of air fuel ratio of engine in a vehicle on which an old type so-called hydraulic pressure system automatic transmission is mounted.

What is claimed is:

1. A control apparatus of a vehicle wherein an automatic transmission having a frictional engagement device which is engaged by hydraulic pressure and sets up a gear shift stage is coupled to an engine which can set up a plurality of output characteristics by varying an air fuel ratio, comprising a hydraulic pressure adjustment means which sets up the pressure adjustment level of the hydraulic pressure supplied to the frictional engagement device in accordance with the maximum output characteristic of the engine, and means for varying the air fuel ratio to lower the output characteristic of the engine only when a gear shift stage set up by the automatic transmission is a highest gear shift stage.

2. A control apparatus of an air fuel ratio in a vehicle equipped with an engine which can set up a plurality of output characteristics by varying the air fuel ratio between a ratio such that an output characteristic of the engine is a maximum output characteristic and another ratio such that the output of the engine is lower than the maximum output characteristic, and an automatic transmission which sets up the pressure adjustment level of a hydraulic pressure supplied to a frictional engagement device in accordance with the maximum output characteristic of the engine comprising:

a gear shift stage detection means which detects the gear shift stage set up by the automatic transmission; and an air fuel ratio adjustment means which allows the set up of the air fuel ratio so that the output characteristic of the engine becomes the lower output characteristic only when the detected gear shift stage is the highest gear shift stage.

3. A control apparatus of an air fuel ratio according to claim 2 further comprising: a means of detecting a water temperature of the engine; and wherein the air fuel ratio adjustment means includes a means of allowing the set tip of air fuel ratio so that the output characteristic of the engine becomes the lower output characteristic than the maximum output characteristic when the detected water temperature is more than the predetermined temperature and the detected gear shift stage is the highest gear stage.

4. A control apparatus of an air fuel ratio according to claim 2, wherein the engine provides: a fuel supply means of varying the air fuel ratio to at least two aspects of high and low; and a swirl control valve which is provided in an air intake passageway and produces a helical flow in a cylinder where the air fuel ratio is raised.

* * * * *

UNITED STATES PATENT AND TRADEMARK OFFICE
CERTIFICATE OF CORRECTION

PATENT NO. : 5,443,594
DATED : AUGUST 22, 1995
INVENTOR(S) : Mitsuru TAKADA ET AL It is certified that error appears in the above-indentified patent and that said Letters Patent is hereby corrected as shown below:

Col.12:

Claim 2, line 11, please change "engine comprising" to --engine, comprising--.

Claim 3, line 5, please change "tip" to --up--.

Signed and Sealed this

Twentieth Day of February, 1996

Attest:

BRUCE LEHMAN

Attesting Officer

Commissioner of Patents and Trademarks